United States Patent
DeMayo

(10) Patent No.: US 9,022,334 B1
(45) Date of Patent: May 5, 2015

(54) OPERATING TABLE QUICK RELEASE CLAMP

(71) Applicant: Edward DeMayo, San Raphael, CA (US)

(72) Inventor: Edward DeMayo, San Raphael, CA (US)

(73) Assignee: Innovative Medical Products, Inc., Plainville, CT (US)

( * ) Notice: Subject to any disclaimer, the term of this patent is extended or adjusted under 35 U.S.C. 154(b) by 148 days.

(21) Appl. No.: 13/986,079

(22) Filed: Apr. 1, 2013

(51) Int. Cl.
A47B 96/06 (2006.01)
A61G 13/10 (2006.01)

(52) U.S. Cl.
CPC ..................... *A61G 13/101* (2013.01)

(58) Field of Classification Search
USPC .................. 248/229.2, 229.22, 229.24, 229.5, 248/229.1, 229.12, 229.14, 229.15, 227.4, 248/228.3, 228.5, 228.6, 230.3, 230.5, 248/230.6, 231.41, 231.6, 1, 231.71; 269/43, 45, 143, 249, 3, 6, 95, 246; 29/276

See application file for complete search history.

(56) References Cited

U.S. PATENT DOCUMENTS

| 3,218,058 | A | * | 11/1965 | Smith | 269/166 |
| 4,057,239 | A | * | 11/1977 | Hopf et al. | 269/170 |
| 4,901,964 | A | | 2/1990 | McConnell | |
| 5,535,973 | A | | 7/1996 | Bailey et al. | |
| 6,499,158 | B1 | * | 12/2002 | Easterling | 5/600 |
| 6,820,621 | B2 | | 11/2004 | De Mayo | |
| 7,003,827 | B2 | | 2/2006 | De Mayo | |
| 7,686,267 | B2 | * | 3/2010 | DaSilva | 248/229.12 |
| 7,722,608 | B2 | * | 5/2010 | Steiner et al. | 606/53 |

* cited by examiner

*Primary Examiner* — Alfred J Wujciak
(74) *Attorney, Agent, or Firm* — Rich Menelly; Damian Wasserbauer; Wasserbauer Law LLC

(57) ABSTRACT

An operating table support clamp includes top and bottom jaw clamps containing a pair of interconnecting rods for allowing movement of the top jaw clamp between open and closed positions, Serrations on the rods interact with serrations within the top jaw clamp for automatically locking the top and bottom jaw clamps together against an operating table side rail.

5 Claims, 3 Drawing Sheets

OPERATING TABLE QUICK RELEASE CLAMP

BACKGROUND OF THE INVENTION

Early methods of clamping to an operating table side rail are described within U.S. Pat. No. 4,901,964 entitled "Rail Clamp" and U.S. Pat. No. 5,535,973 entitled "Universal Clamp"

More recent operating table support clamps for attaching medical surgical support structures are described within U.S. Pat. No. 7,686,267 entitled "Operating Table Support Clamp" and U.S. Pat. No. 7,003,827 entitled "Operating Table Support Clamp".

A surgical support arrangement is described within U.S. Pat. No. 6,820,621 entitled "Lateral Surgical Positioner Unit".

To fasten the surgical support arrangements to the operating table side rails, the associated knobs must be rotated in the clockwise direction sufficiently to insure tight connection there between.

When such surgical support arrangements, attached to the side rail clamps, are to be moved along the operating table side rail, the fastening knobs must be rotated in the counter-clockwise direction to loosen the support clamp sufficiently to release the connection with the operating table side rail and later rotated in the clockwise direction to re-connect again with the side rail.

Since the side rails are delineated by rectangular notches thereon for receiving the jaws of the side rail clamps, positioning of the side rail clamps is thereby limited to the locations of the notches, which are difficult to determine when positioned under the surgical drapes.

It is further noted that most operating table side rails are hinged to allow the table to be raised or lowered, which further prevents movement of the side rail clamps along the operating table side rail.

It would be more efficient to be able to loosen the clamp connection without having to spend time in rotating the support damp knob to first loosen the connection with the operating table side rail, especially when several movements of the surgical support arrangements along the operating table side rail are required.

One purpose of the instant invention is to provide an arrangement for rapidly fastening, loosening and removing an operating table side rail clamp from the operating table side rail in the least amount of time and with a minimum amount of effort without requiring access to the side rail notches

SUMMARY OF THE INVENTION

An operating table support clamp includes top and bottom jaw clamps containing a pair of interconnecting rods. The rods are fixedly attached to the bottom jaw clamp and are arranged for allowing movement of the top jaw clamp between open and closed positions, Serrations on the rods interact with serrations within the top jaw clamp for automatically locking the top and bottom jaw clamps together against an operating table side rail. Controlled movement of the serrations within the top jaw clamp releases the top jaw clamp from the bottom jaw clamp to thereby quickly release the support clamp from the operating table side rail.

DESCRIPTION OF THE PREFERRED EMBODIMENT

Figure 1:
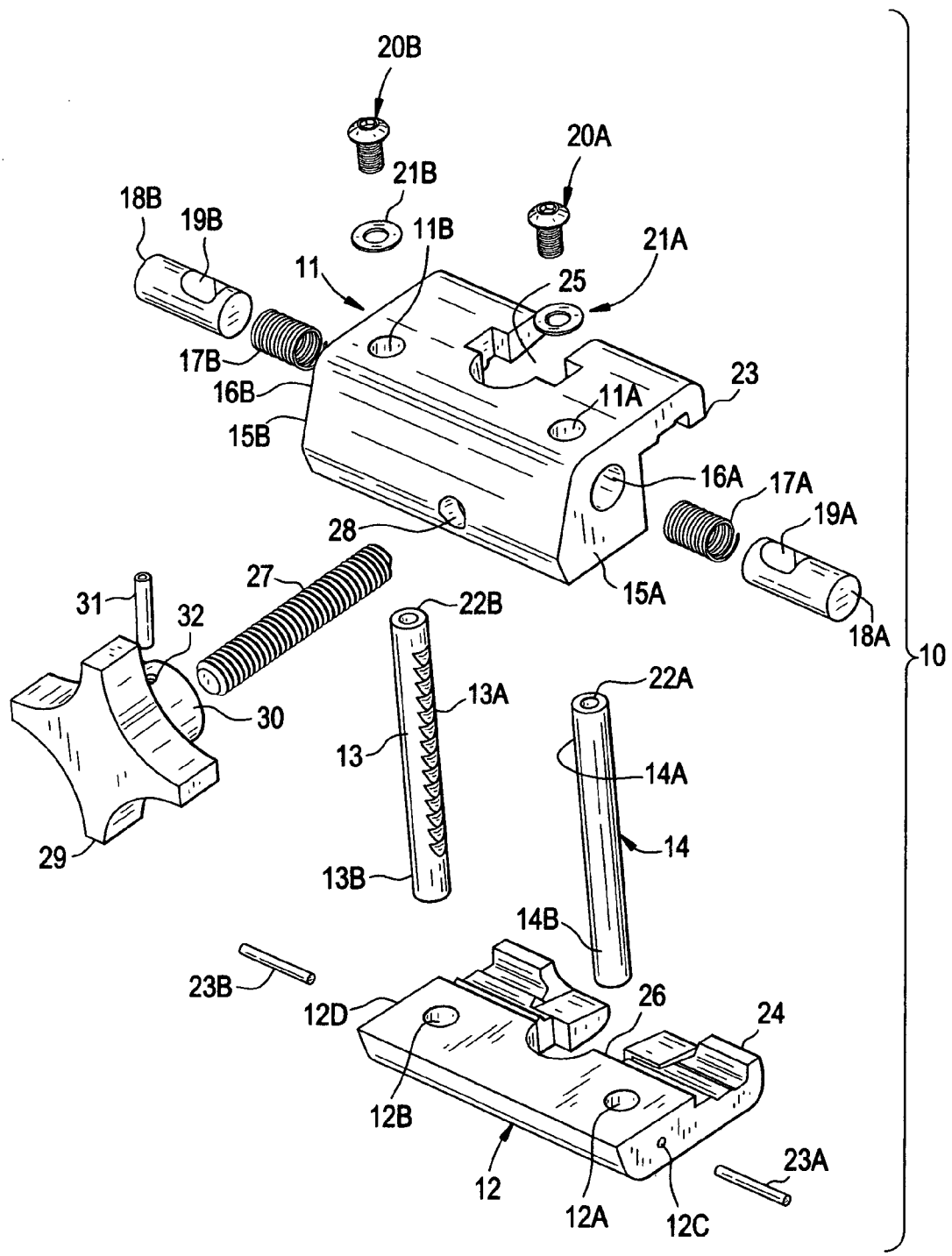
FIG. 1 depicts an exploded front perspective view of the components of the operating table support clamp according to the invention prior to assembly.

The operating table clamp, hereafter "OTC" 10 is depicted in FIG. 1 prior to assembly and includes a top jaw 11 and a bottom jaw 12 wherein the top jaw includes a pair of openings 11A, 11B and the bottom jaw includes a similar pair of openings 12A, 12B for receiving a pair of posts 13, 14.

The posts 13, 14 both include a plurality of serrations 13A, 14A for purposes to be discussed below in greater detail.

The top jaw 11 includes a pair of side plates 15A, 15B with openings 16A, 16B for receiving a pair of springs 17A, 17B along with a pair of plugs 18A, 18B which include elongated slots 19A, 19B for receiving the pair of posts 13, 14.

Figure 2:
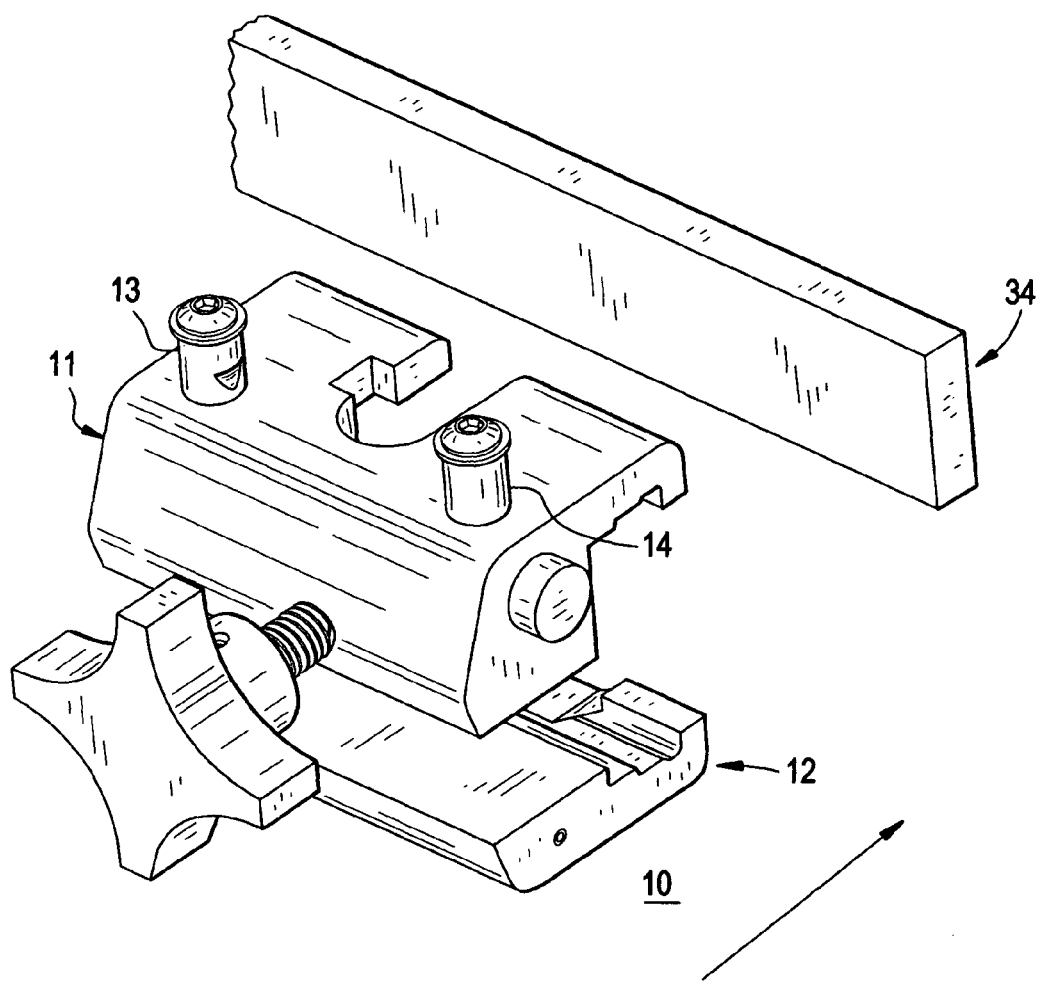
FIG. 2 depicts a front perspective view of the operating table support clamp according to the invention prior to attachment with an operating table side rail.

Once the posts 13, 14 are passed thru openings 19A, 19B and 11A, 11B as shown in FIG. 2, a pair of screws 20A, 20B is passed thru washers 21A, 21B and into the threaded openings 22A, 22B at the top of posts 13, 14 which retains the posts within the top jaw 11.

The bottoms 13B, 14B of the posts 13, 14 are next inserted within the openings 12A, 12B in the bottom jaw 12 and are fastened therein by inserting pins 23A, 23B within openings 12C, 12D.

A top clearance hole 25 is formed thru the top jaw 11 and a bottom clearance hole 26 is formed thru the bottom jaw 12 to allow attachment of medical surgical support structures, as described earlier.

To fasten the medical surgical support structures (not shown) to the operating table side rail 34, shown in FIG. 2, one end of a threaded rod 27 is inserted within the threaded opening 28 in the bottom of the top jaw 11 and the opposite end of the threaded rod is inserted within threaded projection 30 on the knob 29 secured therein by means of the pin 31 within the opening 42 on the threaded projection.

The ridge 23 extending downward along the front of the top jaw 11 is arranged for capturing the top of the side rail 34 of FIG. 2 while the ridge 24 extending upward from the bottom rail 12 is arranged for capturing the bottom of the side rail.

The assembled OTC 10 is now shown in FIG. 2 prior to positioning the top and bottom jaws 11, 12 over the side rail 34 with the tops of the posts 13, 14 extending above the top jaw. Once the side rail 34 is arranged between the top and bottom jaws 11, 12 of the OTC 10, the top clamp is moved in the downward direction as indicated in FIG. 3 along the posts 13, 14 and the knob 29 is rotated to tighten the OTC to the side rail.

It is noted that the serrations 13A are shown on post 13 while a similar plurality of serrations 14A on post 14 are not visible in FIG. 3 such that the interaction between the serrations on post 13 and the interior of the top jaw 11 will be discussed with reference to FIGS. 4 and 5 while the serrations on post 14 react in a similar manner to insure contact between the top and bottom jaws 11, 12 and the side rail 34 but are not indicated herein for purposes of clarity. Referring now to FIG.

4, with the post 13 extending within the slot 19B, the compression spring 17B within the side plate 15 B, contacts the end of the slotted plug 18B forcing the serrations 19C on the interior of the plug into contact with the serrations 13A on the post 13 thereby preventing removal of the top clamp 11 from the bottom clamp 12.

Figure 3:
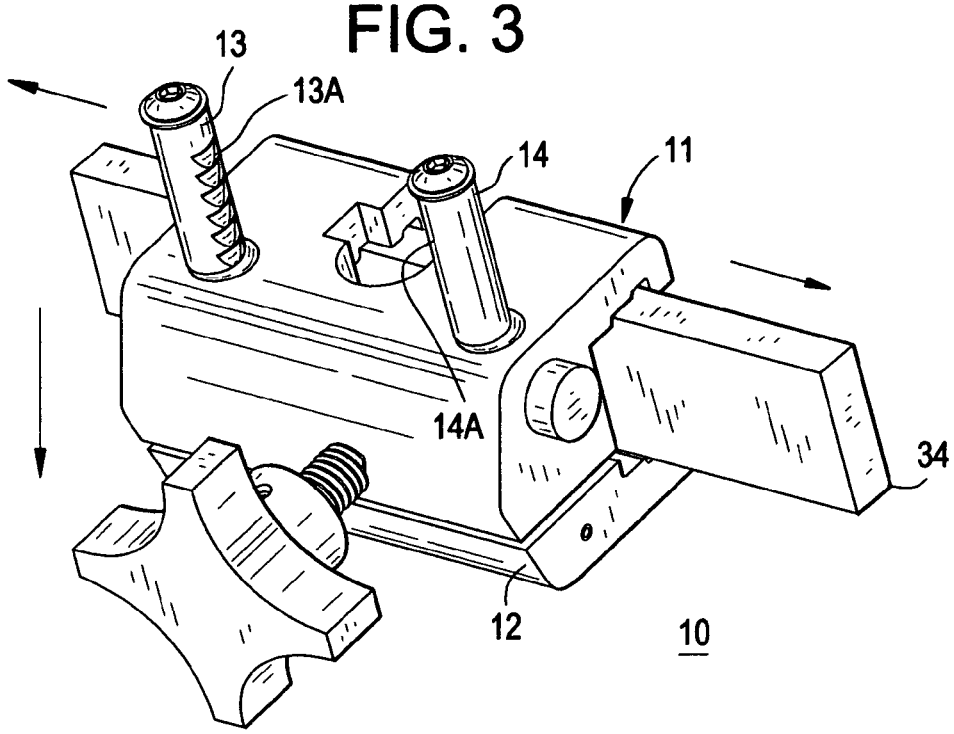
FIG. 3 is an enlarged front perspective view of the operating table support clamp according to the invention attached to the operating table side rail.
Figure 4:
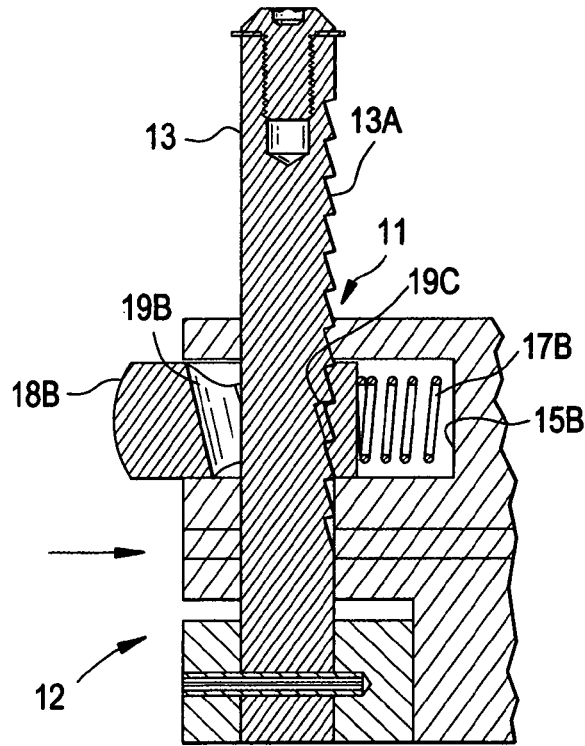
FIG. 4 is an enlarged partial front sectional view of a part of the operating table support clamp of FIG. 3 attached to the operating table side rail.
Figure 5:
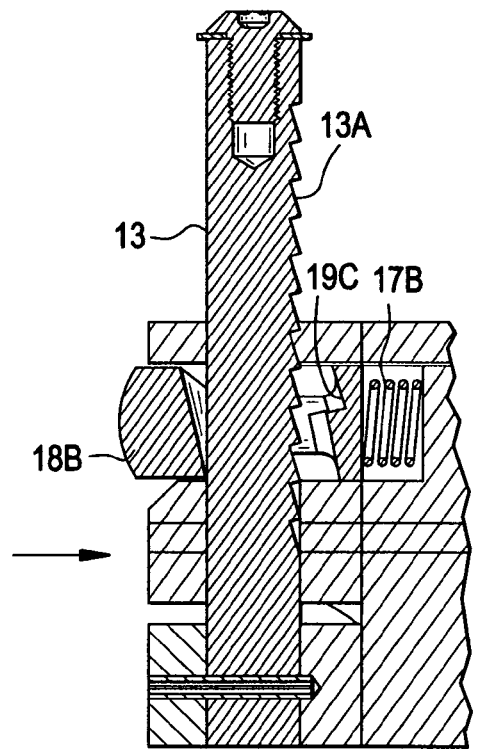
FIG. 5 is an enlarged partial front sectional view of the operating table support clamp of FIG. 3 released from the operating table side rail.

With the serrations 13A, 14A on posts 13, 14 (FIG. 3) in contact with the serrations formed within the ends of the slots 19A, 19B within the plugs 18A, 18B, (FIG. 1) in order to remove the top and bottom jaws 11, 12 from the side rail 34 (FIG. 3) the end of the plug 18B is moved in the indicted direction against the compression spring 17B forcing the compression spring against the inner surface of the side plate 15B as shown in FIG. 4, which moves the serrations 19C on the end of the slot 19B away from the serrations 13A on the post 13 thereby allowing removal of the top jaw 11 from the bottom jaw 12, which in turn, allows the OTC 10 of FIG. 3 to move along the side rail 34 in either direction, as indicated.

Once the OTC 10 is at the desired location, the end of the plugs 18A, 18B are released allowing the compression springs 17A, 17B to move the serrations such as 19C within the plugs back into contact with the serrations 13A, 14A on posts 13, 14 to lock the top jaw 11 and bottom jaw 12 back into contact with the side rail 34 as shown in FIG. 4.

A simple and effective means for momentarily releasing an operating table clamp from an operating table side rail has herein been described to both attach and allow movement of a surgical support device along the operating table.

The invention claimed is:

1. An operating table side rail clamp comprising:
   a top jaw and a bottom jaw interconnecting with a pair of first and second rods;
   a first slotted plug arranged within said top jaw for receiving said first rod;
   a first compression spring arranged within said top jaw adjacent one end of said first plug for forcing said first slotted plug into contact with said first rod when said top jaw and said bottom jaw are in contact with an operating table side rail;
   a connecting knob threadinaly attached to said top jaw for attaching said top and bottom jaws to an operating table surgical support device, wherein said first rod includes a plurality of first rod serrations and first slotted plug includes a plurality of first plug serrations.

2. The operating table side rail clamp of claim 1 said second rod includes a plurality of second rod serrations and second slotted plug includes a plurality of second plug serrations.

3. A method for attaching an operating table side rail clamp to an operating table side rail comprising the steps of:
   providing a top clamp and a bottom clamp along with a first rod and a second rod;
   fastening a first bottom end of said first rod to one end of said bottom clamp;
   fastening a second bottom end of said second clamp to an end of said bottom clamp opposite said one end;
   inserting a first compression spring within one side of said top clamp and a second compression spring within an opposite side of said top clamp;
   inserting a first slotted plug within said one side of said top clamp and a second slotted plug within an opposite side of said top clamp;
   arranging a top of said first rod through said first slotted plug and through a first opening in said top clamp;
   arranging a top of said second rod through said second slotted plug and through a second opening in said top clamp;
   threadingly attaching a connecting knob to said top jaw for connecting said top and bottom jaws with an operating table surgical support device; and
   including the steps of providing a plurality of serrations to said first and second rods.

4. The method of claim 3 including the step of providing a plurality of serrations to one interior end of said first slotted plug.

5. The method of claim 4 including the step of providing a plurality of serrations to one interior end of said second slotted plug.

* * * * *